June 2, 1964  H. A. POHS  3,135,356
AIR LINE OILER
Filed May 11, 1962  2 Sheets-Sheet 1

INVENTOR.
HENRY A. POHS
BY Peter J. Murphy
ATTORNEY

United States Patent Office 3,135,356
Patented June 2, 1964

3,135,356
AIR LINE OILER
Henry A. Pohs, Denver, Colo., assignor to Gardner-Denver Company, a corporation of Delaware
Filed May 11, 1962, Ser. No. 194,067
6 Claims. (Cl. 184—55)

This invention relates to air line oilers of the type for injecting lubricant into conduits for conducting pressurized air from a source of supply to equipment operable by compressed air; and, more particularly, to air line oilers of this type having improved and simplified construction.

It is desirable that air line oilers, of the indicated type, provide means for controlling the flow of oil into the air line, so that the oiler may be used with different types of apparatus which have different demands for lubricant. It is also desirable that the means for feeding the oil and for adjusting the rate of feed be simple, rugged and reliable. It is further desirable that the oiler provide means for adjusting the rate of oil feed from the exterior of the oiler housing. It is further desirable that an air line oiler having the above features be automatic; that is, that the oiler will act to shut off the flow of air to the operated apparatus when the supply of lubricant has been exhausted.

It is an object of this invention to provide an improved air line oiler having external means for adjusting the rate of oil flow. Another object of this invention is to provide an automatic line oiler having external means for adjusting the rate of oil flow. A further object of this invention is to provide an improved air line oiler wherein the means for adjusting the rate of oil flow is in the filler plug and is externally adjustable. A still further object of this invention is to provide an air line oiler which is simple and rugged in construction, which provides ease of adjustment of the rate of oil flow, and which requires a minimum of attention and maintenance.

The novel features of the invention, as well as additional objects and advantages thereof, will be understood more fully from the following description when read in connection with the accompanying drawings, in which:

FIG. 3 is a sectional view taken along the line 3—3 of FIG. 1, looking in the direction of the appended arrows; and FIG. 4 is a fragmentary plan view, partially in section as viewed along the line 4—4 of FIG. 1, looking in the direction of the appended arrows.

Figure 1:
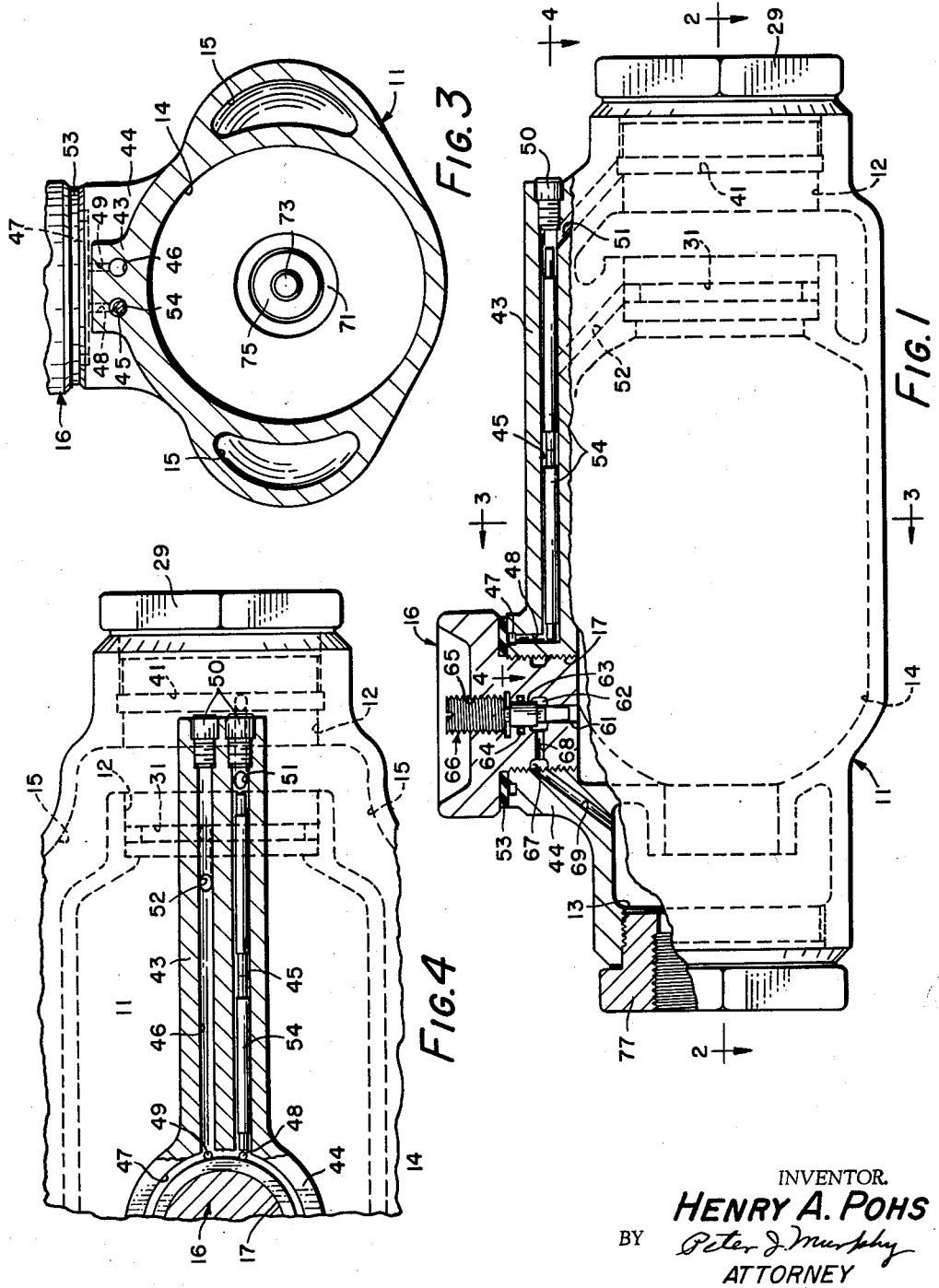
FIG. 1 is a side elevation, partially in section, of an air line oiler, according to the present invention.

In the following description reference will be made to the top and sides of the line oiler housing; however, it will be apparent that the oiler is operable in any position whatever.

Referring now to the drawings, an air line oiler embodying the present invention comprises a housing 11 having: an inlet opening 12, at one end; an outlet opening 13, at the other end; an oil reservoir chamber 14, intermediate the ends; and main air passages 15, communicating the inlet and outlet openings and bypassing the oil chamber 14. A removable filler plug 16 is disposed in an opening 17 communicating the oil chamber with the exterior of the housing. The filler plug includes means for adjusting the rate of oil flow from the chamber to the outlet opening. Means is provided, in the chamber 14, for forcing the oil from the chamber into the air stream.

Figure 2:
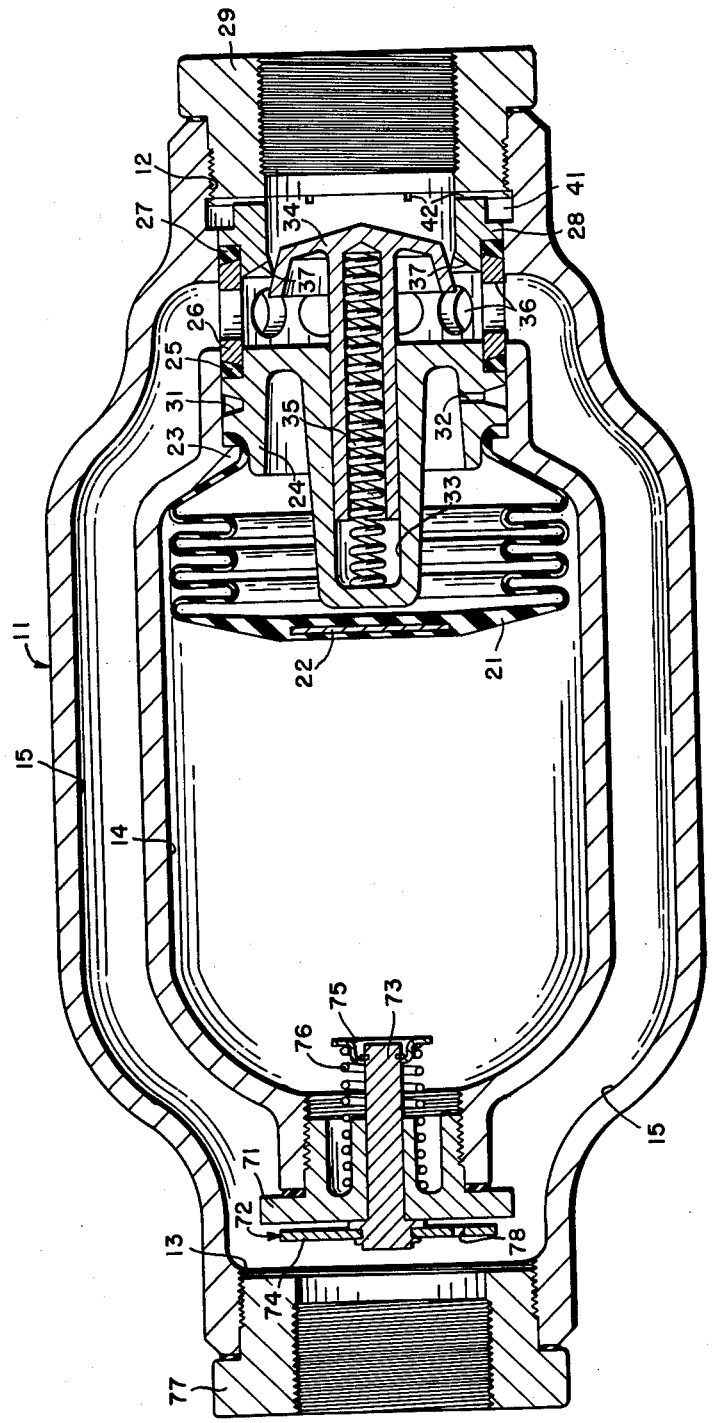
FIG. 2 is a sectional view taken along the line 2—2 of FIG. 1, looking in the direction of the appended arrows.

As best shown in FIG. 2, the inlet opening 12 communicates with the oil chamber 14; and a flexible diaphragm, in the form of a collapsible bulb 21, is mounted within the opening 12 to the oil chamber. The bulb 21 is open in one end and is preferably made from rubber, or a similar material; the side walls of the bulb being fabricated in an accordian or bellows form, and the structure being such that the bulb is self-collapsing to the condition shown in FIG. 2. The open end of the bulb is secured in the inlet opening 12, as will be seen; and the bulb when extended, will substantially fill the oil chamber 14. The end wall of the bulb, opposite from the open end, is provided with a re-enforcing member 22.

The oil chamber wall, adjacent to the inlet opening 12, defines an annular shoulder 23; and the open end of the bulb seats on this shoulder and is secured against the shoulder by means of a stacked assembly which includes a bulb retainer 24, annular seal 25, annular seal retainer 26, annular seal 27, and an annular valve seat member 28; all of these members being dimensioned for a close fit with the walls of the inlet opening 12. The above assembly is secured against the shoulder 23 by a bushing 29 which is threaded into the outer end of the inlet passage and is provided with internal threads for reception of a pipe bushing or an air hose coupling.

The bulb retainer 24 seals the open end of the bulb 21, except that it is provided with an external annular groove 31 and a port 32, communicating the groove 31 with the interior of the bushing and the interior of the bulb. The retainer 24 defines an outwardly facing recess 33, within which is received the stem of an inlet valve 34 which seats against the valve seat member 28. A compression spring 35 is disposed within the recess 33 and within the valve stem, biasing the valve 24 against the seat member.

The seal retainer 26, which is disposed between the valve seat member 28 and the bulb retainer 24, is a ring member having radially spaced ports 36 which communicate with the air passages 15 opening from the inlet opening 12. It will be seen that the inlet valve 34 controls the flow of air from the inlet end of the housing into the air passages 15. The valve seat, defined by the valve seat member 28, includes notches 37 which permit inlet air to bypass the inlet valve in a manner such that the inlet valve is never completely closed.

The interior of the bulb 21 is communicated with the inlet opening 12, ahead of the inlet valve 34, by the following structure. An annular chamber 41 is defined by an external annular groove in the valve seat member 28 and a cooperating internal annular groove in the outlet opening 12. This chamber is communicated with the interior of the seat member 28 by radial slots 42 in the seat member. As best shown in FIGS. 1, 3 and 4, the upper wall of the housing 11 is provided with a longitudinal boss 43 merging with a boss 44 surrounding the filler plug opening 17. Two longitudinal passages 45 and 46 are provided in the boss 43, and communicate with an annular of the passages 45 and 46, remote from the boss 44, are means of vertical ports 48 and 49, respectively. The ends of the passages 45 and 46, remote from the boss 44, are sealed by means of plugs 50. A passage 51 communicates the passage 45 with the annular chamber 41; and a passage 52 communicates the passage 46 with the annular groove 31 in the bulb retainer 24. The ports 48 and 49 are communicated with each other by the annular groove 47 when the latter is closed by the filler plug 16 and its associated sealing gasket 53.

It will be seen then that the interior of the bulb 21 is communicated with the inlet opening 12, ahead of the inlet valve 34, by means of slots 42, annular chamber 41, passages 51 and 45, ports 48 and 49 and annular groove 47, passages 46 and 52, annular groove 31 and port 32. This path need not be of large capacity since the flow of air is small; it being only necessary that the pressure within the bulb 21 be the same as the pressure at the inlet end of the line oiler. When the filler plug is removed, the passage 45 represents an opening from the inlet opening 12 to atmosphere; and, therefore, it is desirable that this passage be as small as possible. Since it is impractical to drill a pin hole passage of substantial length, this passage is drilled larger and air metering pins 54 are placed therein to prevent excessive loss of air when the filler plug is removed. It should also be noted that, when the filler plug is removed, the bulb 21 is vented to atmosphere through the passage 46; and this is for the purpose of effecting the collapse of the bulb 21 to permit the refilling of the oil chamber 14 with lubricant.

As best shown in FIG. 1, the means for metering the flow of oil from the oil reservoir into the air stream is provided in the filler plug 16. The filler plug is threaded into the opening 17, the lower end of the plug communicating with the oil chamber 14. A central bore through the filler plug includes a lower tapered valve seat 61, an adjacent chamber 62, a cylindrical portion 63 having an annular groove for receiving a sealing O-ring 64, and an upper threaded portion 65. A metering valve 66 includes a lower tapered portion for mating engagement with the tapered valve seat 61; an intermediate cylindrical portion for sealing engagement with the O-ring 64; and an upper threaded portion for threaded engagement with the threaded portion 65. The upper end of the valve 66 is provided with a transverse screw driver slot, whereby the valve may be rotated to adjust its axial position within the filler plug bore.

The threaded portion of the filler plug 16 is provided with an external annular groove 67 which is communicated with the chamber 62 by a transverse passage 68. A lubricant discharge passage 69, provided in the housing 11, communicates the annular groove 67 with the outlet opening 13 of the housing when the filler plug 16 is seated. It will be seen that the oil flows from the oil chamber 14 into the air stream at the outlet opening 13, through the above described metering structure. The metering valve 66 may be adjusted relative to the valve seat 61 to control the flow of lubricant. It has been found that the O-ring 64 provides sufficient resistance to turning so that the valve 66 will not rotate out of adjustment due to vibration or other effects.

When air is flowing through the oiler, the pressure of the air in the passages 15 and in the outlet opening 13 is somewhat lower than the pressure in the inlet opening 12, ahead of the inlet valve 34, since the inlet valve acts as a pressure-reducing valve. As above mention, the pressure in the bulb 21 is the same as that in the inlet opening 12; therefore, there is a pressure differential between the oil chamber 14 and the outlet opening 13 which causes the lubricant to flow from the discharge passage 69.

As best shown in FIG. 2, the end of the oil chamber 14, adjacent to the outlet opening 13 is provided with a threaded opening which is closed by a shut-off valve bushing 71 having an axial bore. A shut-off valve 72 comprises a stem 73, which is slidably received within the bore of the shut-off valve bushing, and a disc member 74, which is secured against a shoulder on the outer end of the stem 73 by means of a rivet. A spring retainer 75 is secured to the inner end of the stem 73, within the oil chamber 14, by means of a snap ring; and a compression spring 76 is confined between the spring retainer and the bushing 71 to bias the valve 72 to the open position shown in FIG. 2. The valve disc 74 is dimensioned to engage the inner end of a bushing 77, which is threaded into the outlet opening 13 of the housing 11; the bushing 77 being internally threaded to receive a pipe bushing or an air hose coupling. The outlet valve disc 74 is provided with a bleed port 78, the function of which will be described in connection with the operation of the air line oiler.

When the lubricant in the oil chamber is exhausted, the bulb 21 will have expanded to substantially fill the oil chamber 14; and the closed end of the bulb, carrying the re-enforcing element 22, will engage the inner end of the stem 73 of the shut-off valve and move the shut-off valve against the spring 76 until the disc 74 engages the bushing 77. This prevents the flow of air from the outlet end of the oiler, thus preventing the operation of the operated tool, and the operator will know that the lubricant in the oiler is exhausted.

The operation of the above described air line oiler will now be briefly summarized. When the oiler is connected to a tool which is not being operated, the tool valve is shut off so that air is not flowing through the line. At this time, the pressure in the air line, including the oiler, up to the tool is the same. The pressure within the bulb 21 is also the same; and this pressure is applied directly to the lubricant within the chamber 14 by means of the bulb 21. When the tool valve is opened, the pressure downstream of the inlet valve 34 is immediately reduced, and the pressure differential between the bulb 21 and the oil discharge passage 69 effects immediate flow of oil from the discharge passage. Almost simultaneously, the inlet valve 34 opens to permit full flow of air through the passages 15, this air picking up oil from the discharge passage 69. The above mentioned pressure differential will be maintained by the inlet valve 34 which acts as a pressure reducing valve.

When the operator shuts off the tool valve, the inlet valve 34 closes under the action of its spring 35; however, the pressure downstream of the inlet valve will become balanced with the upstream pressure since air will continue to flow through the notches 37 until the pressure becomes equalized. When this pressure is equalized, the flow of oil from the discharge passage 69 will cease.

When the lubricant in the oil chamber 14 becomes nearly exhausted, the bulb 21 will engage the inner end of the shut-off valve 72, and will move the shut-off valve against the spring 76 until the valve seats against the bushing 77 to shut off the flow of air from the oiler. The tool will, of course, cease to operate, and the operator may attend to the refilling of the oiler, first shutting off the tool valve. When the tool valve is shut off, the air upstream of the shut-off valve 72 will bleed through the port 78 in the outlet valve disc 74 until the pressure on both sides of the valve is equalized. This will permit the spring 76 to return the shut-off valve to its normal position, shown in FIG. 2.

The filler plug 16 is removed for the purpose of replenishing the lubricant supply in the oil chamber 14. When the filler plug is removed, the bulb 21 is vented through port 49, passages 46 and 52, annular groove 31 and port 32. This permits the bulb to collapse to the position shown in FIG. 2. When the filler plug is replaced and the annular groove 47 is sealed by the filler plug gasket, the port 49 is again communicated with the port 48 and the pressure within the bulb 21 will build up to the inlet line pressure. The oiler is then ready for continued operation.

What is claimed is:
1. An air line oiler comprising:
   a housing having a main air passage, including inlet and outlet openings for connection to an air conduit, and an oil chamber; a pressure reduction valve in said main air passage;
   means defining a filler opening in said housing, communicating with said oil chamber, for supplying oil to said chamber; a filler plug for sealing said filler opening;
   said filler plug having an oil passage, opening to the inner portion of said plug to communicate with said oil chamber, and opening to the side of said plug to communicate with the wall of said filler opening;
   said housing having an oil passage, opening to the wall of said filler opening to communicate with said plug oil passage, and opening to said main air passage at the outlet side of said pressure reduction valve; an oil metering valve disposed in said filler plug oil passage for regulating the flow of oil through said oil passages;

a flexible bulb disposed in said oil chamber, constructed to expand and contract within said chamber; means defining an air passage in said housing, communicating said bulb with said main air passage at the inlet side of said pressure reduction valve, to subject said bulb to inlet pressure; and said inlet pressure being applied, through said bulb, to the oil confined within said oil chamber.

2. The invention set forth in claim 1 wherein said oil metering valve includes adjusting means accessible from the exterior of said plug.

3. The invention set forth in claim 1 wherein said bulb air passage opens into said filler opening to vent said bulb when said filler plug is removed from said opening.

4. The invention set forth in claim 1 including:
means defining a recess in said housing adjacent to said filler opening, disposed to be sealed by said filler plug; said recess defining a portion of said bulb air passage; and said recess being opened to atmosphere, when said filler plug is removed, to vent said bulb.

5. The invention set forth in claim 1 wherein said filler opening is a threaded opening; said filler plug being externally threaded to be received in said opening;
said filler plug having an axial bore comprising an outer threaded portion, an inner valve seat portion, and an intermediate chamber portion; said plug having an external annular groove, at its externally threaded portion, and a radial passage communicating said groove and said chamber portion; said filler plug oil passage being defined by said valve seat portion, said chamber portion, said radial passage and said annular groove; said housing oil passage communicating said main air passage and said filler opening adjacent to said annular groove in said plug;

said metering valve comprising an outer threaded portion, for threaded engagement in said plug bore, and an inner valve closure portion, for cooperation with said valve seat portion; and means for rotating said metering valve to regulate the valve opening.

6. The invention set forth in claim 1 including:
a shut-off valve defined by valve seat means, at said outlet opening, and a valve closure member mounted for rectilinear movement in said housing; said shut-off valve closure member comprising a head, disposed for seating engagement with said shut-off valve seat, and a stem extending into said oil chamber, for engagement by said bulb; means urging said shut-off valve closure member out of engagement with said shut-off valve seat;

and said bulb disposed to engage said stem, to effect closure of said shut-off valve, when said bulb has expanded due to depletion of oil in said oil chamber.

References Cited in the file of this patent

UNITED STATES PATENTS 2,897,919    Dellner _____ Aug. 4, 1959

UNITED STATES PATENT OFFICE
CERTIFICATE OF CORRECTION

June 2, 1964

Patent No. 3,135,356

Henry A. Pohs

It is hereby certified that error appears in the above numbered patent requiring correction and that the said Letters Patent should read as corrected below.

Column 2, line 54, for "of the passages 45 and 46, remote from the boss 44, are" read -- groove 47 in the upper face of the filler plug boss 44 by --.

Signed and sealed this 20th day of October 1964.

(SEAL)
Attest:

ERNEST W. SWIDER
Attesting Officer

EDWARD J. BRENNER
Commissioner of Patents